United States Patent
Zhu et al.

(10) Patent No.: US 7,098,645 B1
(45) Date of Patent: Aug. 29, 2006

(54) METHOD AND DEVICE FOR CABLE LENGTH MEASUREMENT BASED ON REFLECTED PHASE SHIFTS

(75) Inventors: Xing Zhu, Singapore (SG); Harshang Pandya, Singapore (SG); Ravi-Kishore Doddavaram, Singapore (SG)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 11/226,612

(22) Filed: Sep. 14, 2005

(51) Int. Cl.
*G01R 19/00* (2006.01)

(52) U.S. Cl. .................. 324/76.11; 324/539; 324/543; 324/534; 702/158

(58) Field of Classification Search .............. 324/539
See application file for complete search history.

(56) References Cited

U.S. PATENT DOCUMENTS

| | | | |
|---|---|---|---|
| 2003/0222654 A1* | 12/2003 | Furse et al. | 324/543 |
| 2004/0230383 A1* | 11/2004 | Bechhoefer et al. | 702/57 |
| 2005/0242825 A1* | 11/2005 | Bottman et al. | 324/539 |

* cited by examiner

*Primary Examiner*—Vincent Q. Nguyen

(57) ABSTRACT

An offline phase of a cable length measuring method involves a determination of a plurality of preset frequency test signals for facilitating the length measurement of the cable based on a maximum measurable length of the cable. An online phase minimally involves a measurement of the length of the cable based on a first reflected phase shift between a first preset frequency test signal as transmitted at a transmission end of the cable and a first preset frequency reflection signal representative of a reflection of the first preset frequency test signal at a reflection end of the cable, and based on a second reflected phase shift between the second preset frequency test signal as transmitted at the transmission end of the cable and a second preset frequency reflection signal representative of a reflection of the second preset frequency test signal at the reflection end of the cable.

20 Claims, 8 Drawing Sheets

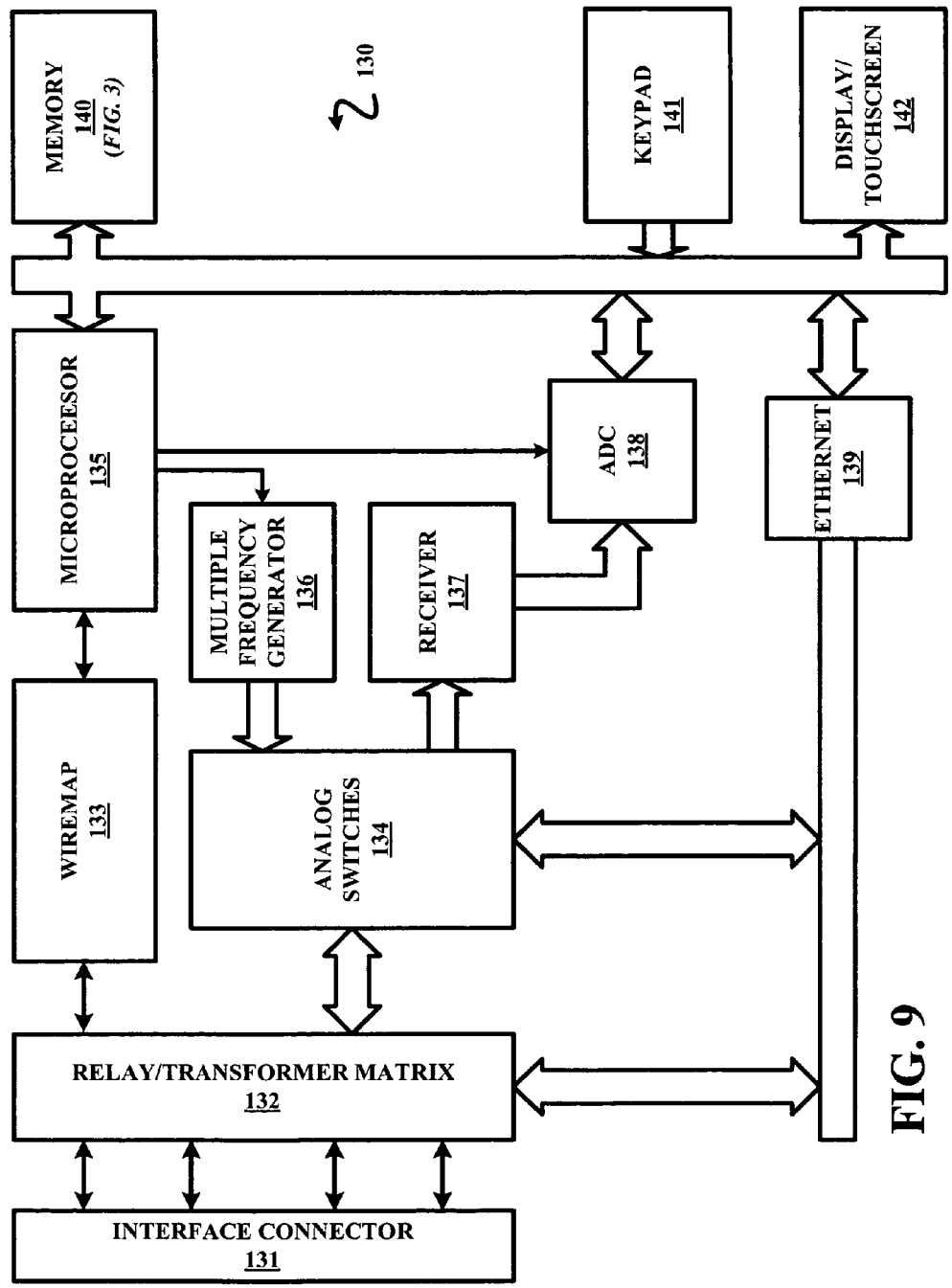

METHOD AND DEVICE FOR CABLE LENGTH MEASUREMENT BASED ON REFLECTED PHASE SHIFTS

BACKGROUND OF THE INVENTION

FIG. 1 illustrates a cable tester 20 that applies a test signal in the form of a frequency sweep test signal $V_{TSWEEP}$ to a cable 10 to thereby measure the length of cable 10. Specifically, frequency sweep test signal $V_{TSWEEP}$ is applied to a transmission end 11 of cable 10 as a series of stepped-up frequency sine waves that travel to a reflection end 12 of cable 10 and are reflected back to the transmission end 11 of cable 10 as a frequency sweep reflected signal $V_{RSWEEP}$. A frequency-domain reflectometry ("FAR") system can be used by cable tester 20 to measure the length of cable 10 based on the frequency response of the frequency sweep reflected signal $V_{RSWEEP}$. Examples of a FAR system include a frequency-modulated continuous wave system ("FMCW"), a standing-wave reflectometry ("SWR") system and a phase-detection reflectometry ("PDFDR") system.

A drawback to FAR systems is the time consumption required to execute the sweep frequency points (e.g., 400 frequency points) of the frequency sweep test signal $V_{TSWEEP}$ from its lowest frequency (e.g., 1 MHz) to its highest frequency (e.g., 256 MHz). Thus, a need exists to provide a technique for measuring the length of a cable with minimal frequency points over a reliable frequency range.

SUMMARY OF THE INVENTION

The present invention provides a new and unique method for measuring a length of cable based on reflected phase shifts corresponding to two or more preset frequency test signals.

A first form of the present invention is a method of operating a cable tester in measuring a length of a cable. The method involves a determination of a plurality of preset frequency test signals for facilitating a length measurement of a cable based on a maximum measurable length of the cable. The method further involves a measurement of the length of the cable based on a first reflected phase shift between a first preset frequency test signal as transmitted at a transmission end of the cable and a first preset frequency reflection signal representative of a reflection of the first preset frequency test signal at a reflection end of the cable, and based on a second reflected phase shift between a second preset frequency test signal as transmitted at the transmission end of the cable and a second preset frequency reflection signal representative of a reflection of the second preset frequency test signal at the reflection end of the cable.

A second form of the present invention is a cable tester comprising a processor and a memory operable to store instructions operable with the processor for measuring a length of a cable. The instructions being executable for determining a plurality of preset frequency test signals for facilitating a length measurement of a cable based on a maximum measurable length of the cable. The instructions being further executable for measuring the length of the cable based on a first reflected phase shift between a first preset frequency test signal as transmitted at a transmission end of the cable and a first preset frequency reflection signal representative of a reflection of the first preset frequency test signal at a reflection end of the cable, and based on a second reflected phase shift between a second preset frequency test signal as transmitted at the transmission end of the cable and a second preset frequency reflection signal representative of a reflection of the second preset frequency test signal at the reflection end of the cable.

A third form of the present invention is a cable tester comprising means for determining a plurality of preset frequency test signals for facilitating a length measurement of a cable based on a maximum measurable length of the cable. The cable tester further comprises means for measuring the length of the cable based on a first reflected phase shift between a first preset frequency test signal as transmitted at a transmission end of the cable and a first preset frequency reflection signal representative of a reflection of the first preset frequency test signal at a reflection end of the cable, and based on a second reflected phase shift between a second preset frequency test signal as transmitted at the transmission end of the cable and a second preset frequency reflection signal representative of a reflection of the second preset frequency test signal at the reflection end of the cable.

The aforementioned forms and other forms as well as objects and advantages of the present invention will become further apparent from the following detailed description of the various embodiments of the present invention read in conjunction with the accompanying drawings. The detailed description and drawings are merely illustrative of the invention rather than limiting, the scope of the present invention being defined by the appended claims and equivalents thereof.

BRIEF DESCRIPTION OF THE DRAWINGS

FIG. 9 illustrates one embodiment in accordance with the present invention of the cable tester illustrated in FIG. 2.

DETAILED DESCRIPTION OF THE PRESENT INVENTION

Figure 1:
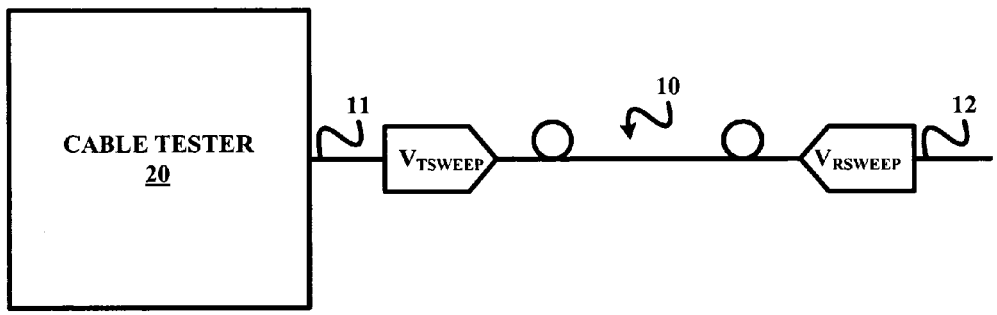
FIG. 1 illustrates a cable tester for measuring a length of a cable as known in the art.
Figure 2:
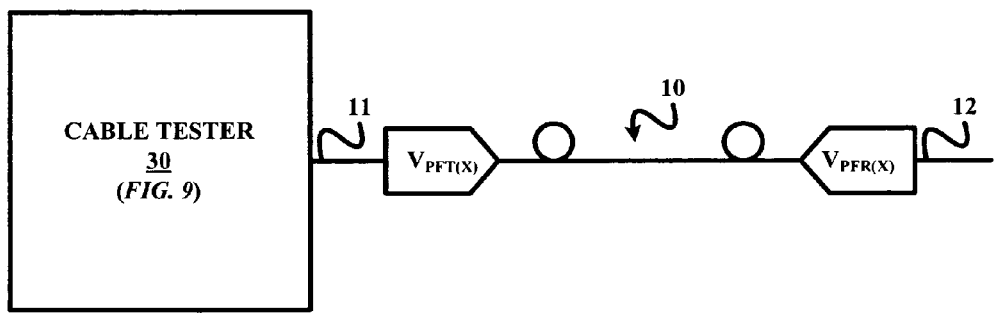
FIG. 2 illustrates a cable tester for measuring a length of a cable in accordance with the present invention.

FIG. 2 illustrates a cable tester 30 that generates an X number of preset frequency test signals $V_{PFT(X)}$ having a sine waveform, a square waveform, a triangle waveform, a saw tooth waveform or any other alternating current ("AC") waveform, where $X \geq 2$. Thus, at a minimum, the X number of preset frequency test signals $V_{PFT(X)}$ will consist of a pair of preset frequency test signals, and to enhance the length measurement of cable 10, the X number of preset frequency test signals $V_{PFT(X)}$ may consist of additional preset frequency test signals.

In operation, each preset frequency test signals $V_{PFT(X)}$ is applied to a transmission end 11 of cable 10 as an AC voltage or an AC current that travels to a reflection end 12 of cable 10 and is reflected back to the transmission end 111 of cable 10 as a preset frequency reflection signal $V_{PFR(X)}$. A reflected phase shift between each preset frequency test signals $V_{PFT(X)}$ and its corresponding preset frequency reflection signal $V_{PFR(X)}$ serves as a basis for measuring the length of cable 10. To this end, cable tester 30 operates in accordance with a cable tester operation method of the present invention represented by a flowchart 40 illustrated in FIG. 3.

Figure 3:
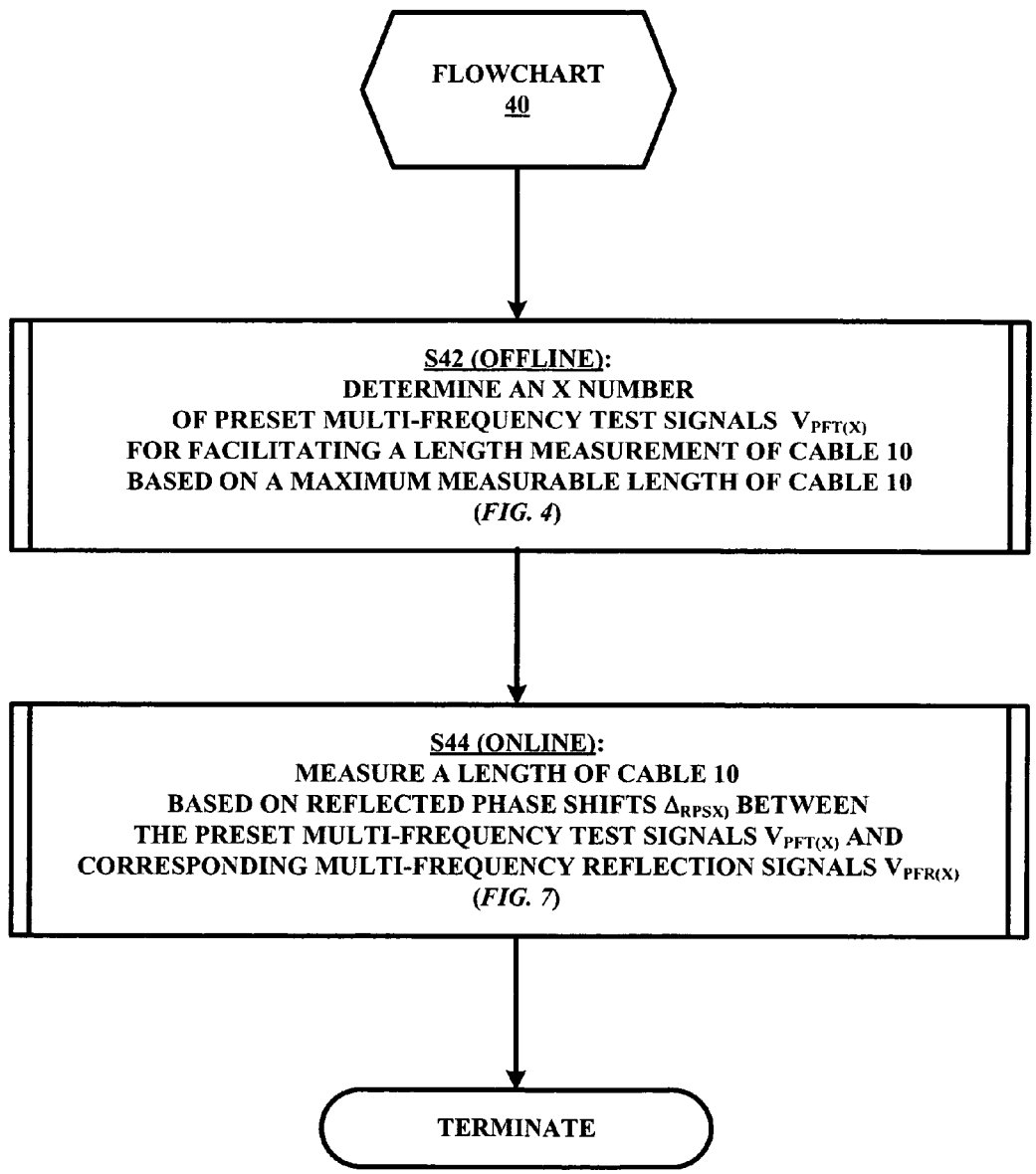
FIG. 3 illustrates a flowchart representative of one embodiment of a cable tester operation method in accordance with the present invention.

Referring to FIG. 3, a stage S42 of flowchart 40 encompasses cable tester 30 operating in an offline state to determine a X number of preset multi-frequency test signals $V_{PFT(X)}$ for facilitating a length measurement of cable 10 based on a maximum measurable length of cable 10 (e.g., 100 meters). In practice, the present invention does not impose any limitations or any restrictions to the manner by which stage S42 is implemented by cable tester 30. In one embodiment of stage S42, cable tester 30 implements stage S42 in accordance with a preset multi-frequency test signals determination method of the present invention represented by a flowchart 50 illustrated in FIG. 4. The following description of flowchart 50 is in the context of X equaling 2 for purposes of facilitating an understanding of the preset multi-frequency test signals determination method of the present invention.

Figure 4:
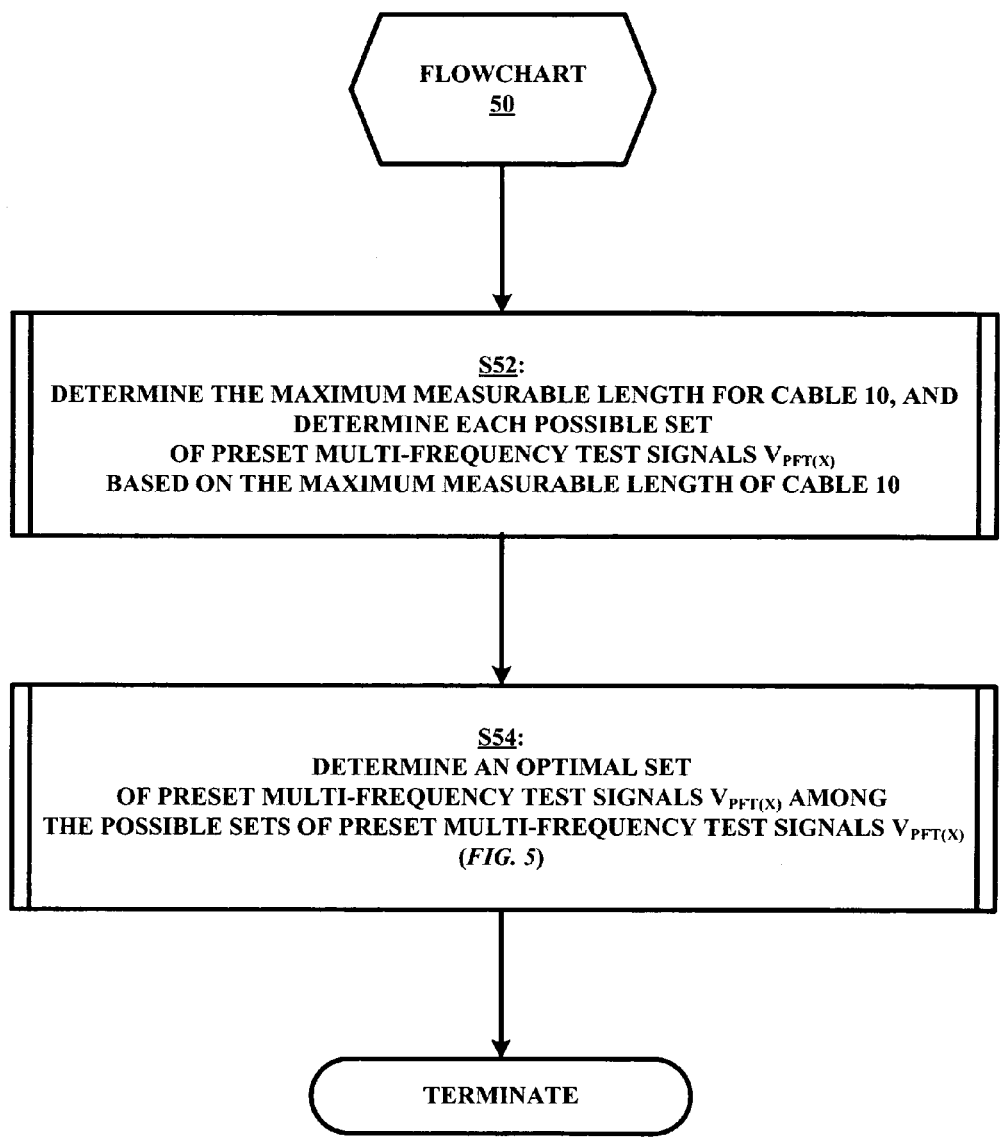
FIG. 4 illustrates a flowchart representative of one embodiment of a preset multi-frequency test signals determination method in accordance with the present invention.

Referring to FIG. 4, a stage S52 of flowchart 50 encompasses cable tester 30 determining the maximum measurable length of cable 10 and determining each possible set of preset multi-frequency test signals $V_{PFT(X)}$ based on the maximum measurable length of cable 10. In one embodiment of stage S52, cable tester 30 determines each possible set of preset multi-frequency test signals $V_{PFT(X)}$ based on a maximum measurable length $\Delta L_{MAX}$ of cable 10 in accordance with the following equations [1] and [2]:

$$\Delta L_{MAX} = \alpha_{LPT} * \alpha_{HPT} * \lambda_0 \qquad [1]$$

$$\lambda_0 = (c*NVP)/2 \qquad [2]$$

where c is the speed of light and NVP is a nominal velocity of current propagation through cable 10 expressed as a percentage of c. Additionally, $\alpha_{LPT}$ is an integer denominator of a lowest preset test frequency of a particular preset multi-frequency set, and $\alpha_{HPT}$ is an integer denominator of a highest preset test frequency of the same preset multi-frequency set assuming integer denominators $\alpha_{LPT}$ and $\alpha_{HPT}$ do not have a common divisor. If integer denominators $\alpha_{LPT}$ and $\alpha_{HPT}$ do have a common divisor, then $\alpha_{LPT}$ is an minimum common multiple value based on common divisor for the lowest preset test frequency of a particular preset multi-frequency set, and $\alpha_{HPT}$ is a minimum common multiple value based on the common divisor for the highest preset test frequency of the same preset multi-frequency set.

In practice, cable tester 30 may estimate each possible set of preset multi-frequency test signals $V_{PFT(X)}$ based on the maximum measurable length $\Delta L_{MAX}$ of cable 10. Cable tester 30 is therefore not required to perform a definite calculation of each possible set of preset multi-frequency test signals $V_{PFT(X)}$ based on the maximum measurable length $\Delta L_{MAX}$ of cable 10.

A stage S54 of flowchart 50 encompasses cable test 30 determining the optimal set of among each possible set of preset multi-frequency test signals $V_{PFT(X)}$. In practice, the present invention does not impose any limitations or any restrictions to the manner by which stage S54 is implemented by cable tester 30. In one embodiment of stage S54, cable tester 30 implements stage S54 in accordance with an optimal preset multi-frequency determination method of the present invention represented by a flowchart 60 illustrated in FIG. 5. The following description of flowchart 60 is in the context of X equaling 2 for purposes of facilitating an understanding of the optimal preset multi-frequency determination method of the present invention represented by flowchart 60.

Figure 5:
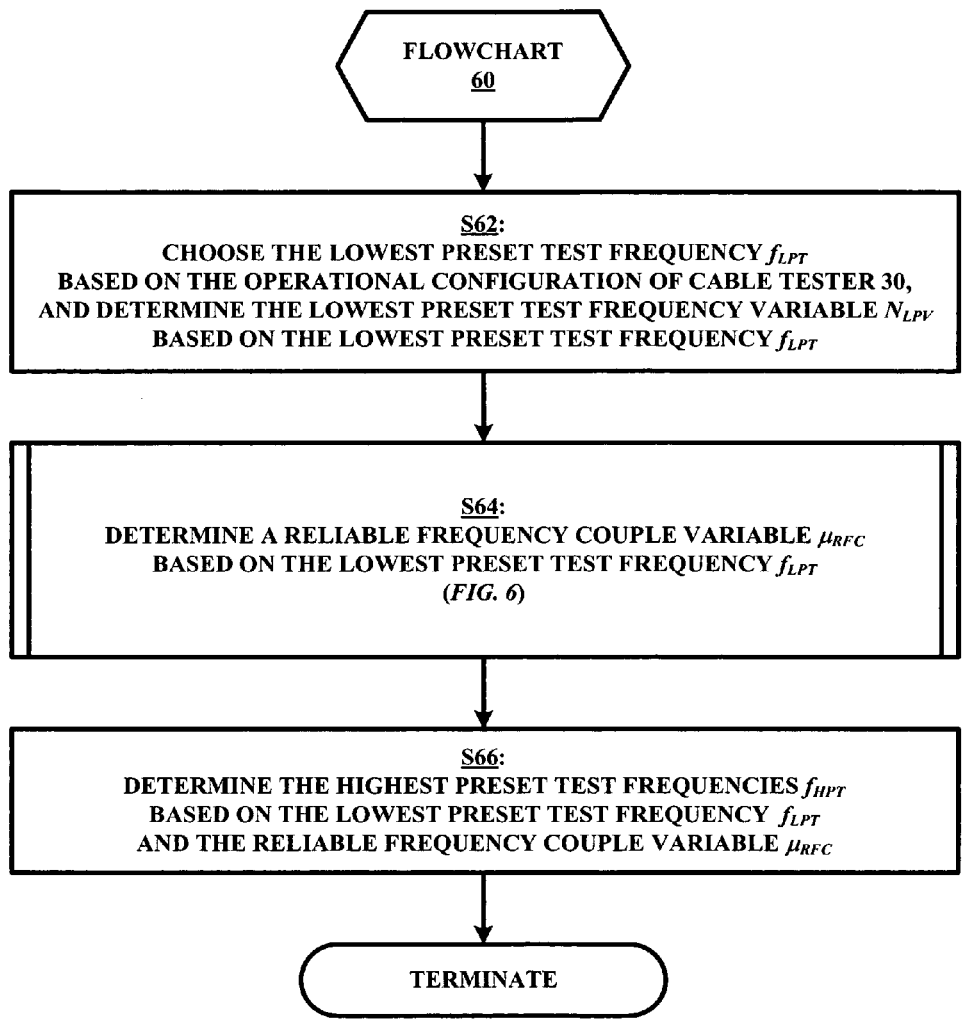
FIG. 5 illustrates a flowchart representative of one embodiment of an optimal preset multi-frequency determination method in accordance with the present invention.

Referring to FIG. 5, a stage S62 of flowchart 60 encompasses cable tester 30 choosing the lowest preset test frequency $f_{LPT}$ based on the operational configuration of cable tester 30, and determining a lowest preset test frequency variable $N_{LPT}$ based on the lowest preset test frequency $f_{LPT}$. In one embodiment of stage S62, cable tester 30 determines the lowest preset test frequency variable $N_{LPT}$ in accordance with the following equations [3] and [4]:

$$N_{LPT} = \text{Round}(\Delta L_{MAX}/\lambda_{LPT}) \qquad [3]$$

$$\lambda_{LPT} = (\frac{1}{2})*((c*NVP)/f_{LPT}) \qquad [4]$$

where $\lambda_{LPT}$ is the half-wavelength of the lowest preset test frequency $f_{LPT}$.

A stage S64 of flowchart 60 encompasses cable tester 30 determining a reliable frequency couple variable $\mu_{RFC}$ based on the lowest preset test frequency $f_{LPT}$. In practice, the present invention does not impose any limitations or any restrictions to the manner by which stage S64 is implemented by cable tester 30. In one embodiment of stage S64, cable tester 30 implements stage S64 in accordance with a reliable frequency couple variable determination method of the present invention represented by a flowchart 70 illustrated in FIG. 6. The following description of flowchart 70 is in the context of X equaling 2 for purposes of facilitating an understanding of the reliable frequency couple variable determination method of the present invention.

Figure 6:
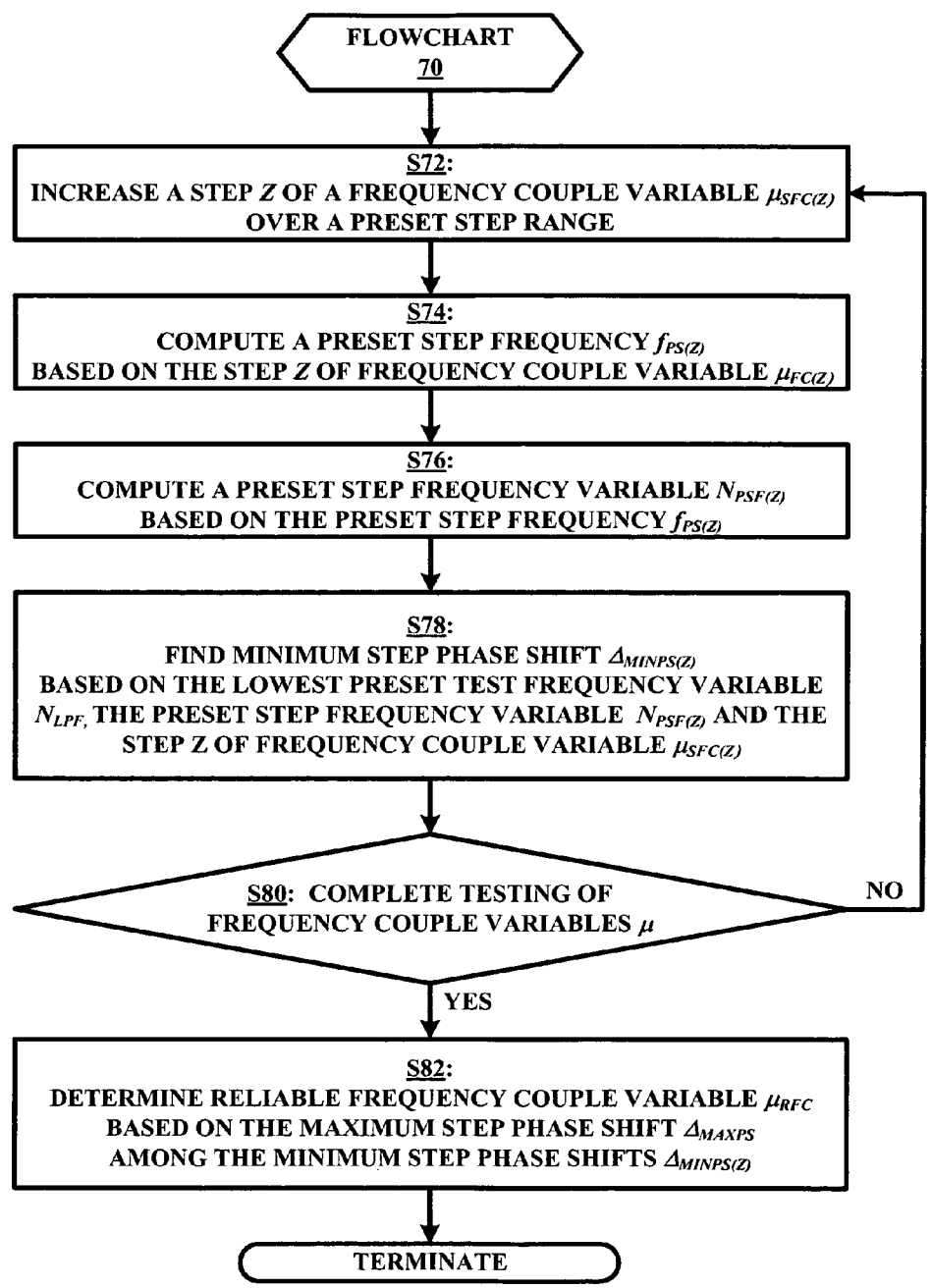
FIG. 6 illustrates a flowchart representative of one embodiment of a reliable frequency couple variable determination method in accordance with the present invention.

Referring to FIG. 6, a stage S72 of flowchart 70 encompasses cable tester 30 increase a step Z of a step frequency couple variable $\mu_{SFC(Z)}$ over a preset step range. For example, with a preset step range of 1<μ<6, step Z would be increased from a base value of 1 by a step value (e.g., 0.1 or 0.01) during a first execution of stage S72 by cable tester 30. In practice, the preset step range and the step value are a function of a desired accuracy of length measurement of cable 10 as would be appreciated by those having ordinary skill in the art.

A stage S74 of flowchart 70 encompasses cable tester 30 computing a preset step frequency $f_{PS(Z)}$ based on the step Z of the step frequency couple variable $\mu_{SFC(Z)}$. In one embodiment of stage S74, the preset step frequency $f_{PS(Z)}$ is computed in accordance with the following equation [5]:

$$f_{PS(Z)} = \mu_{SFC(Z)} * f_{LPT} \qquad [5]$$

A stage S76 of flowchart 70 encompasses cable tester 30 computing a preset step frequency variable $N_{PSF(Z)}$ based on the preset step frequency $f_{PS(Z)}$. In one embodiment of stage S76, cable tester 30 computes the preset step frequency variable $N_{PSF(Z)}$ in accordance with the following equations [6] and [7]:

$$N_{PSF(Z)} = \text{Round}(\Delta L_{MAX}/\lambda_{PSF(Z)}) \qquad [6]$$

$$\lambda_{PSF(Z)} = (\frac{1}{2})*((c*NVP)/f_{PS(Z)}) \qquad [7]$$

where $\lambda_{PSF(Z)}$ is the half-wavelength of preset step frequency $f_{PS(Z)}$.

A stage S78 of flowchart 70 encompasses cable tester 30 determining a minimum step phase shift ΔMINPS(Z) based on the lowest preset test frequency variable $N_{LPTF}$, the preset step frequency couple variable $N_{PSF(Z)}$ and the step Z of the step frequency couple variable $\mu_{SFC(Z)}$. In one embodiment of stage S78, cable tester 30 determines a minimum step phase shift $\Delta_{MINPS(Z)}$ based on the lowest preset test frequency variable $N_{LPTF}$, the preset step frequency variable $N_{PSF(Z)}$ and the step Z of the step frequency couple variable $\mu_{SFC(Z)}$ in accordance with the following equation [8]:

$$\Delta_{MINPS(Z)} = \min \left\{ \left\| \begin{matrix} \mu-1 & 2\mu-1 & \ldots & N_2\mu-1 \\ \mu-2 & 2\mu-2 & \cdots & N_2\mu-2 \\ \vdots & \vdots & \ddots & \vdots \\ \mu-N_1 & 2\mu-N & \cdots & N_2\mu-N_{LPV} \end{matrix} \right\|_{N_1 \times N_2} \right\} \quad [8]$$

where $N_1$ is the lowest preset test frequency variable $N_{LPTF}$, $N_2$ is the preset step frequency variable $N_{PSF(Z)}$ and $\mu$ is the step Z of the step frequency couple variable $\mu_{SFC(Z)}$.

A stage S80 of flowchart 70 encompasses cable tester 30 reiterating stages S72–S78 until such time all values of step Z have been tested for $\mu_{SFC(Z)}$. For example, in the context of preset step range of $1<\mu<6$ with step Z having a base value of 1.0 and the step value being 0.1, the execution of stages S72–S78 for each step of Z would yield forty-nine (49) minimum step phase shift $\Delta_{MINPS(Z)}$.

A stage S82 of flowchart 70 encompasses cable tester 30 determining the reliable frequency couple variable $\mu_{RFC}$ based on a maximum step phase shift $\Delta_{MAXPS}$ among the minimum step phase shift $\Delta_{MINPS(Z)}$. For example, in the context of preset step range of $1<\mu<6$ with step Z having a base value of 1.0 and the step value being 0.1, the execution of stage S82 would yield a reliable frequency couple variable $\mu_{RFC}$ corresponding to a maximum step phase shift $\Delta_{MAXPS}$ among the forty-nine (49) minimum step phase shift $\Delta_{MINPS(Z)}$.

Referring again to FIG. 5, a stage S66 of flowchart 60 encompasses cable tester 30 determining the highest preset test frequency $f_{HPT}$ based on the lowest preset test frequency $f_{LPT}$ and the reliable frequency couple variable $\mu_{RFC}$. In one embodiment of stage S66, cable tester 30 determines the highest preset test frequency $f_{HPT}$ based on the lowest preset test frequency $f_{LPT}$ and the reliable frequency couple variable $\mu_{RFC}$ in accordance with the following equation [9]:

$$f_{HPT} = \mu_{RFC} * f_{LPT} \quad [9]$$

Referring again to FIG. 3, various levels of the inventive principles of the present invention for implementing offline stage S42 have been described in connection with FIGS. 4–6. Those having ordinary skill in the art will appreciate the readiness of cable tester 30 to proceed to a stage S44 of flowchart 40 upon completion of stage S42.

Still referring to FIG. 3, stage S44 encompasses cable tester 30 operating in an online state to measure a length of cable 10 based on the reflected phase shifts $\Delta_{RPS(X)}$ between each preset frequency test signal $V_{PFT(X)}$ and its corresponding preset frequency reflection signal $V_{PFR(X)}$. In practice, the present invention does not impose any limitations or any restrictions to the manner by which stage S44 is implemented by cable tester 30. In one embodiment of stage S44, cable tester 30 implements stage S44 in accordance with a cable length measurement method of the present invention represented by a flowchart 90 illustrated in FIG. 7. The following description of flowchart 90 is in the context of X equaling 2 for purposes of facilitating an understanding of the cable length measurement method of the present invention.

Figure 7:
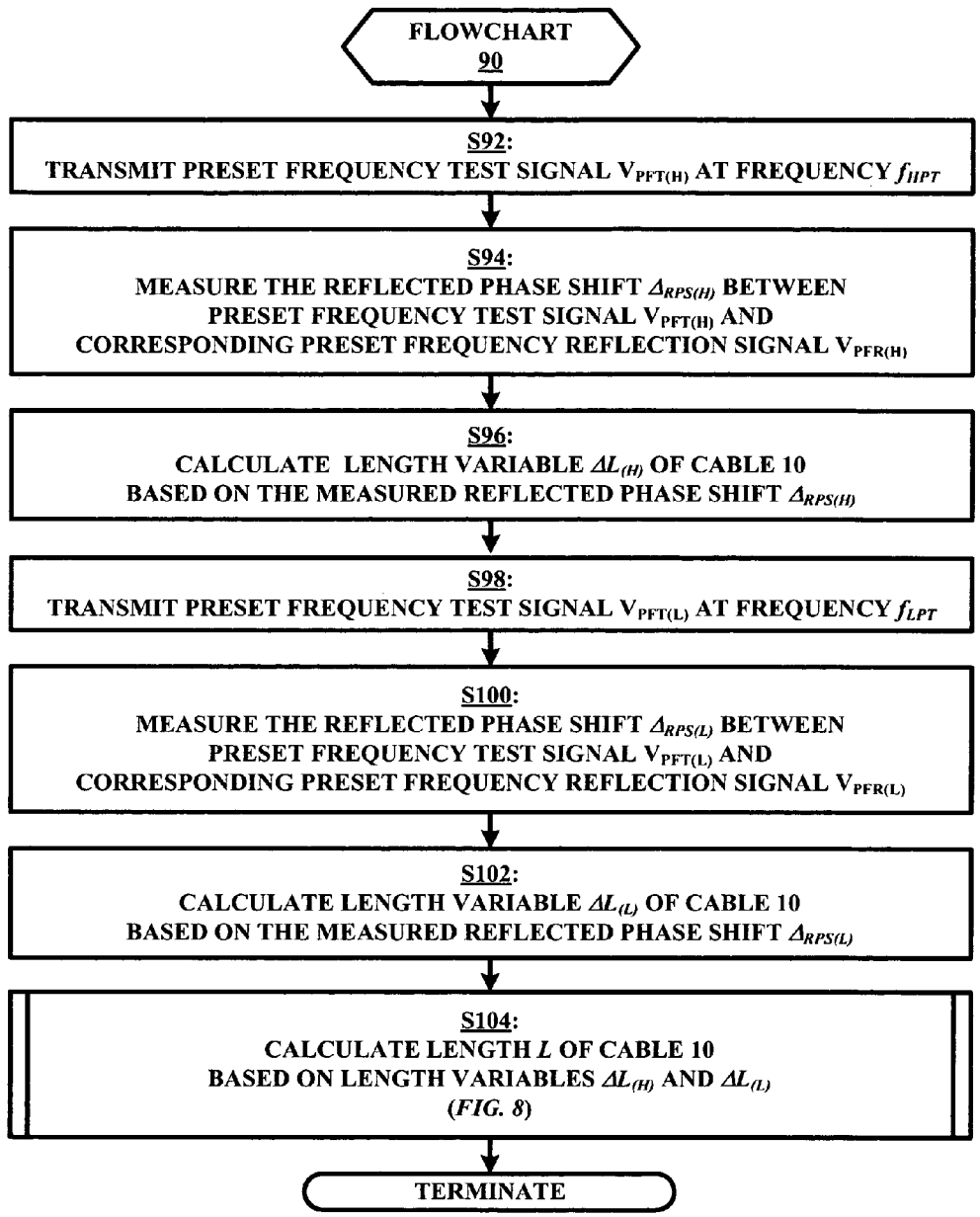
FIG. 7 illustrates a flowchart representative of one embodiment of a cable length measurement method in accordance with the present invention.

Referring to FIG. 7, a stage S92 of flowchart 90 encompasses cable tester 30 transmitting the highest preset frequency test signal $V_{PFT(H)}$ at the highest preset test frequency $f_{HPT}$ at a transmission end 11 of cable 10 as would be appreciated by those having ordinary skill in the art. A stage S94 of flowchart 90 encompasses cable tester 30 measuring a reflected phase shift $\Delta_{RPS(H)}$ between the highest preset frequency test signal $V_{PFT(H)}$ and its corresponding highest preset frequency reflection signal $V_{PFR(H)}$ as would be appreciated by those having ordinary skill in the art. A stage S96 of flowchart 90 encompasses cable tester 30 calculating a length variable $\Delta L_{(H)}$ of cable 10 based on the measured reflected phase shift $\Delta_{RPS(H)}$. In one embodiment of stage S96, cable tester 30 calculates the length variable $\Delta L_{(H)}$ of cable 10 based on the measured reflected phase shift $\Delta_{RPS(H)}$ in accordance with the following equation [10]:

$$\Delta L_{(H)} = (1/2) * ((c*NVP)/f_{HPT}) * (\Delta_{RPS(H)}/360) \quad [10]$$

A stage S98 of flowchart 90 encompasses cable tester 30 transmitting the lowest preset frequency test signal $V_{PFT(L)}$ at the lowest preset test frequency $f_{LPT}$ at a transmission end 11 of cable 10 as would be appreciated by those having ordinary skill in the art. A stage S100 of flowchart 90 encompasses cable tester 30 measuring a reflected phase shift $\Delta_{RPS(L)}$ between the lowest preset frequency test signal $V_{PFT(L)}$ and its corresponding lowest preset frequency reflection signal $V_{PFR(L)}$ as would be appreciated by those having ordinary skill in the art. A stage S102 of flowchart 90 encompasses cable tester 30 calculating a length variable $\Delta L_{(L)}$ of cable 10 based on the measured reflected phase shift $\Delta_{RPS(L)}$. In one embodiment of stage S102, cable tester 30 calculates the length variable $\Delta L_{(L)}$ of cable 10 based on the measured reflected phase shift $\Delta_{RPS(L)}$ in accordance with the following equation [11]:

$$\Delta L_{(L)} = (1/2) * ((c*NVP)/f_{LPT}) * (\Delta_{RPS(L)}/360) \quad [11]$$

A stage S104 of flowchart 100 encompasses cable tester 30 calculating length L of cable 10 based on the length variables $\Delta L_{(H)}$ and $\Delta L_{(L)}$. In practice, the present invention does not impose any limitations or any restrictions to the manner by which stage S104 is implemented by cable tester 30. In one embodiment of stage S104, cable tester 30 implements stage S104 in accordance with a cable length calculation method of the present invention represented by a flowchart 10 illustrated in FIG. 8. The following description of flowchart 110 is in the context of X equaling 2 for purposes of facilitating an understanding of the cable length calculation method of the present invention.

Figure 8:
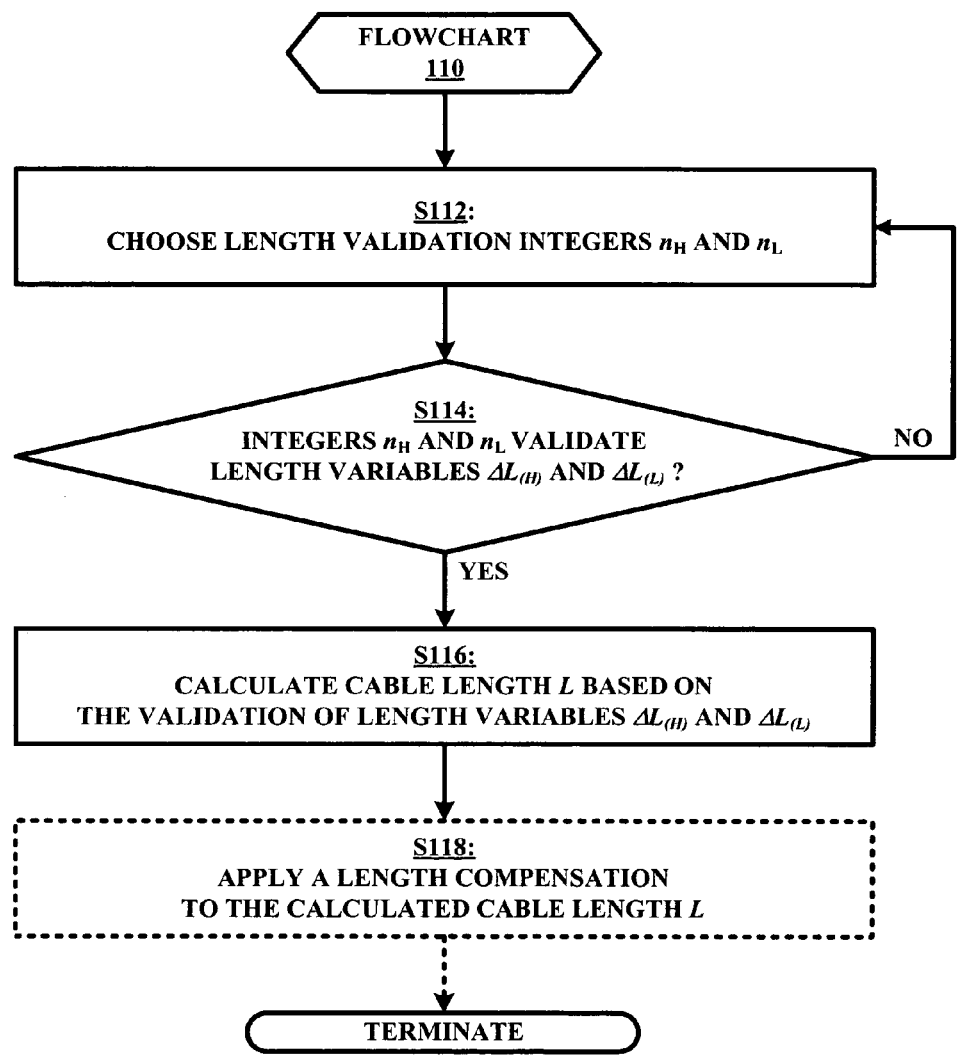
FIG. 8 illustrates a flowchart representative of one embodiment of cable length calculation method in accordance with the present invention.

Referring to FIG. 8, a stage S112 of flowchart 110 encompasses cable tester 30 choosing a highest length validation integer $n_H$ and a lowest length validation integer $n_L$. In one embodiment of stage S110, cable tester 30 chooses the highest length validation integer $n_H$ and a lowest length validation integer $n_L$ in accordance with the following equations [12]–[15]:

$$n_H \in [0, \text{Round}(\Delta L_{MAX}/\lambda_H)] \quad [12]$$

$$\lambda_H = (1/2) * ((c*NVP)/f_{HPT}) \quad [13]$$

$$n_L \in [0, \text{Round}(\Delta L_{MAX}/\lambda_L)] \quad [14]$$

$$\lambda_L = (1/2) * ((c*NVP)/f_{LPT}) \quad [15]$$

where $\lambda_H$ is the half-wavelength of the highest preset test frequency $f_{HPT}$ and $\lambda_L$ is the half-wavelength of the lowest preset test frequency $f_{LPT}$.

A stage S114 of flowchart 100 encompasses cable tester 30 determining whether the highest length validation integer $n_H$ and the lowest length validation integer $n_L$ validate the length variables $\Delta L_{(H)}$ and $\Delta L_{(L)}$. In one embodiment of stage S114, the highest length validation integer $n_H$ and the lowest length validation integer $n_L$ validate the length variables $\Delta L_{(H)}$ and $\Delta L_{(L)}$ in accordance with the following equation [16] and fail to validate the length variables $\Delta L_{(H)}$ and $\Delta L_{(L)}$ in accordance with the following equation [17]:

$$(n_H * \lambda_H) + \Delta L_{(H)} = (n_L * \lambda_L) + \Delta L_{(L)} \quad [16]$$

$$(n_H * \lambda_H) + \Delta L_{(H)} \neq (n_L * \lambda_L) + \Delta L_{(L)} \quad [17]$$

Stages S112 and S114 are repeated by cable tester 30 until such time the highest length validation integer $n_H$ and the lowest length validation integer $n_L$ validate the length variables $\Delta L_{(H)}$ and $\Delta L_{(L)}$.

A stage S116 of flowchart 110 encompasses cable tester 30 calculating the length L of cable 10 based on the validation of the length variables $\Delta L_{(H)}$ and $\Delta L_{(L)}$. In one embodiment of stage S116, cable tester 30 calculate the length L of cable 10 based on the validation of the length variables $\Delta L_{(H)}$ and $\Delta L_{(L)}$ in accordance with the following equation [18]:

$$L = (n_H * \lambda_H) + \Delta L_{(H)} = (n_L * \lambda_L) + \Delta L_{(L)} \quad [18]$$

An optional stage S118 encompasses cable tester 30 applying a length compensation to the length L of cable 10 calculated during stage S116. In one embodiment S118, an initial length compensation is determined by choosing several cables with actual length (e.g. 10 m, 30 m, 60 m, 100 m), using the inventive principles of the present invention as described herein to measure the length of the cables, and database recording any difference between the actual length of each cable and the measured length of each cable. If stage S118 is implemented, this recorded difference serves as the length compensation that can be applied to the length L of cable 10 calculated during stage S116.

In a second embodiment of stage S118, compensation for testing with far end short involves choosing several cables with actual length (e.g. 10 m, 30 m, 60 m, 100 m), using the inventive principles of the present invention as described herein to measure the length of the cables with far end open and far end short, and database recording any difference between the measured length of each cable with far end open and the measured length of each cable with far end short. If stage S118 is implemented, this recorded difference serves as the length compensation that can be applied to the length L of cable 10 calculated during stage S116 for far end short case.

From the preceding description of FIGS. 2–8, those having ordinary skill in the art will appreciate how to use the present invention in the context of two preset frequency test signals $V_{PFT(X)}$. From the following description of a detailed process for deriving the two preset frequency test signals based on the maximum measurable length of the cable, those having ordinary skill in the art will appreciate how to derive three or more preset frequency test signals based on the maximum measurable length of the cable.

Specifically, suppose there are two preset frequency test signals $V_{PFT(L)}$ and $V_{PFT(H)}$ at respective $f_{LPT}=5.5$ MHZ ($\lambda_L=19.6$ m) and $f_{HPT}=11.0$ MHZ ($\lambda_H=9.8$ m), and the detected reflected phase shifts are $\Delta_{RPS(L)}=246.1°$ and $\Delta_{RPS(H)}=132.2°$, respectively. The result is $\Delta L_{(L)}=13.4$ m and $\Delta L_{(H)}=3.6$ m in accordance with equations [10] and [11] herein in the context of NVP equaling 0.8. An initial search of length validation integers $n_L$ and $n_H$ within respective ranges $n_L \in [0, 5]$ and $n_H \in [0, 6]$ reveals a cable length L=13.4 m for $n_L=0$ and $n_H=1$ in accordance with equation [18] herein. A second search of length validation integers $n_L$ and $n_H$ within respective ranges $n_L \in [0, 5]$ and $n_H \in [0, 6]$ reveals a cable length L=33.0 m for $n_L=1$ and $n_H=3$ in accordance with equation [18] herein. A third and final search of length validation integers $n_L$ and $n_H$ within respective ranges $n_L \in [0, 5]$ and $n_H \in [0, 6]$ reveals a cable length L=52.6 m for $n_L=2$ and $n_H=5$ in accordance with equation [18] herein Clearly, for this example, it is unknown whether the true length L of the cable is 13.4 m, 33.0 m or 52.6 m. Thus, to be able to determine the true length L of the cable, it must be determined whether for one cable with length $L \in [0,100]$ meters, how to choose the pair of preset test frequencies $f_{LPT}$ and $f_{HPT}$ that ensures there is one and only one pair of length validation integers $n_L$ and $n_H$ for the two reflective phase shift $\Delta_{RPS(L)}$ and $\Delta_{RPS(H)}$ that complies with equation [18]. To this end, the inventors have discovered two rules for ensuring there is one and only one pair of length validation integers $n_L$ and $n_H$ for the two reflective phase shift $\Delta_{RPS(L)}$ and $\Delta_{RPS(H)}$ that complies with equation [18].

The first rule is the maximum measurable length of a cable for a X number of preset test frequency signals is in accordance with the following equation [19]:

$$\Delta L_{MAX} = \alpha_1 * \alpha_2 * \alpha_3 * \ldots \alpha_x * \lambda_0 \quad [19]$$

Equation [19] is derived from the following analysis of two sine signals at frequencies $f_1$ and $f_2$ and their respective half-wavelengths $\lambda_1$ and $\lambda_2$ known in accordance with following equations [20] and [21]:

$$\lambda_1 = (1/2) * ((c * NVP)/f_1) = \lambda_0/f_1 \quad [20]$$

$$\lambda_2 = (1/2) * ((c * NVP)/f_2) = \lambda_0/f_2 \quad [21]$$

In this analysis, if we consider (1) the existence of two cables with respective lengths $L_a$ and $L_b$ (assuming $L_b > L_a$), (2) the reflected phase shift $\Delta_1$ for both cables at frequency $f_1$ is the same, (3) the reflected phase shift $\Delta_2$ for both cables at frequency $f_2$ is the same, and (4) there is no additional cable with length $L_c \in [L_a, L_b]$ such that its phase shifts at frequencies $f_1$ and $f_2$ are the respective reflected phase shift $\Delta_1$ and, then it can be stated that "With the two input sine signals at frequency $f_1$ and $f_2$, any cable with length $L \in [0, (L_b - L_a)]$ meters can be measured correctly with a unique result, i.e. there are one and only one couple of integers $n_1$ and $n_2$ such that $L = n_1 \cdot \lambda_1 + \Delta L_1 = n_2 \cdot \lambda_2 + \Delta L_2$".

Furthermore, if you choose two frequencies, the max possible cable length can be measured is $(L_b - L_a)$. The physical meaning behind this statement is that $(L_b - L_a)$ represents the period of the phase shifts of the reflected sine signals. That is, for two cables with length l and $l+(L_b-L_a)$, the reflected phase shifts are the same.

Now the question becomes finding the relationship between two frequencies $f_1$, $f_2$ and $(L_b - L_a)$. In order to achieve this, we may start from the following equations [22]:

$$\begin{cases} L_a = n_1 \lambda_1 + \Delta L_1 \\ L_a = n_1 \lambda_1 + \Delta L_1 \end{cases} \text{ and } \begin{cases} L_b = m_1 \lambda_1 + \Delta L_1 \\ L_b = m_2 \lambda_2 + \Delta L_2 \end{cases} \quad [22]$$

where $m_i$, $n_i$ (i=1,2) are integers.

Since we assume $L_b > L_a$, it is clear that $m_i > n_i$, (i=1,2). Then from equations [22], we have the following equation [23]:

$$\Delta L = L_b - L_a = (m_1 - n_1)\lambda_1 = (m_2 - n_2)\lambda_2 \quad [23]$$

It is clear that any frequencies $f_1$, $f_2$ can be represented as $$f_1 = \frac{\beta_1}{\alpha_1} \text{ and } f_2 = \frac{\beta_2}{\alpha_2},$$

where $\alpha_1$, $\alpha_2$ and $\beta_1$, $\beta_2$ are integers. Then from equation [23], we have the following equation [24]:

$$\Delta L = L_b - L_a = \frac{\alpha_1}{\beta_1}(m_1 - n_1)\lambda_0 = \frac{\alpha_2}{\beta_2}(m_2 - n_2)\lambda_0 \qquad [24]$$

From equation [24], we have the following equation [25]:

$$\frac{\beta_1 \beta_2}{\lambda_0} \Delta L = \frac{\beta_1 \beta_2}{\lambda_0}(L_b - L_a) = \alpha_1 \beta_2 (m_1 - n_1) = \alpha_2 \beta_1 (m_2 - n_2) \qquad [25]$$

Observing equation [25], and considering the previous discussion, in order to get the maximize length that can be measured with frequencies $f_1$ and $f_2$, we need get one period (equivalent to minimum) value of $\Delta L = L_b - L_a$ and at the same time $a_1\beta_2(m_1-n_1)=\alpha_2\beta_1(m_2-n_2)$. So we need find the minimum common multiple value of $\alpha_1\beta_2$ and $\alpha_2\beta_1$. It is easy that the minimum common multiple value of $\alpha_1\beta_2$ and $\alpha_2\beta_1$ $\alpha_1\alpha_2\beta_1\beta_2$ (here we assume $\alpha_1$ and $\alpha_2$ don't have common divisor. If there is a common divisor, this common divisor can be moved to the left side of equation [25] and then calculate minimum common multiple value.).

Now we have the maximum length that can be measured with sine signals at frequencies $f_1$ and $f_2$ is accordance with equation [26]:

$$\Delta L_{max} = (L_b - L_a)_{max} = \alpha_1 \alpha_2 \lambda_0 \qquad [26]$$

Observing equation [23], we have an interesting conclusion, that is, the max length can be measured with frequencies $f_1$ and $f_2$ only depends on the integer denominator $\alpha_1$ and $\alpha_2$ of $f_1$ and $f_2$, but not related to the integer numerator of $f_1$ and $f_2$.

For example, if $$f_1 = \frac{\beta_1}{1}\text{MHz and } f_2 = \frac{\beta_2}{1}\text{MHz} \quad (\beta_1 \text{ and } \beta_2 \text{ can be any integers}),$$

the maximum length can be measured is $\Delta L_{max} = \lambda_0 = 108$ meters.

If $f_2 = \frac{\beta_2}{1}$MHz ($\beta_1$ and $\beta_2$ can be any integers), then the $\Delta L_{max} = 2\lambda_0 = 216$ meters.

In conclusion, the maximum measure-able length of the cable is $\alpha_1\alpha_2\lambda_0$, which serves as the basis for equation [19].

The first rule guarantees the maximum measure-able length of cable. It is clear based on the first rule that there are many possible frequencies can be chosen to support the measure-able length of the cable. Thus, the second rule is to determine, among all these possible frequencies supporting the maximum measure-able length, the two frequencies which are the most robust for length measurement.

To this end, we define what is a robust measurement. It is know that for a particular cable, we have the following equations [27]:

$$\begin{cases} L_1 = n_1 \lambda_1 + \Delta L_1 \\ L_2 = n_2 \lambda_2 + \Delta L_2 \end{cases} \qquad [27]$$

In the above equations, if we want to calculate the length, we need to search the integers $n_1$ and $n_2$ in the set $$n_1 \in \left[0, \text{Round}\left(\frac{\Delta L_{MAX}}{\lambda_1}\right)\right] \text{ and } n_2 \in \left[0, \text{Round}\left(\frac{\Delta L_{MAX}}{\lambda_2}\right)\right]$$

to find a couple of $n_1^L$ and $n_2^L$ such that $L=L_1=L_2$. Please note rule 1 guarantees that there are one and only one couple of $n_1^L$ and $n_2^L$ such that $L=L_1=L_2$, However, for the other possible $n_1$ and $n_2$, though $L_1 \neq L_2$, the difference between $L_1$ and $L_2$ (i.e. $|L_1-L_2|$) may be very close to zero in practice when disturbed by something like the measurement noise originated from device hardware, etc. In such situation, it may be difficult to distinguish the correct result and pseudo-results due to measurement noise.

In order to avoid such situation as much as possible, and make the length measurement more robust to the measurement noise, we could search multi-frequency couples which maximizes the $|L_1-L_2|$ for all possible couple of $n_1$ and $n_2$, except $n_1^L$ and $n_2^L$ where $|L_1-L_2|=0$.

To solve the problem, we start the analysis from the following equations [28]:

$$\begin{cases} L_1 = (n_1^L + i)\lambda_1 + \Delta L_1 \\ L_2 = (n_2^L + j)\lambda_2 + \Delta L_2 \end{cases} \qquad [28]$$

where $i \in [-n_1^L, -1] \cup [1, N_1]$, $$N_1 = \text{Round}\left(\frac{\Delta L_{MAX}}{\lambda_1}\right) \text{ and } j \in [-n_2^L, -1] \cup [1, N_2],$$

$$N_2 = \text{Round}\left(\frac{\Delta L_{MAX}}{\lambda_2}\right).$$

Physical meaning of the equations [28] provides all the possible length could be computed with all possible couple of $n_1$ and $n_2$ except the actually length L (where i=0,j=0).

From equation [28], we have the following equation [29]:

$$\Delta = |L_1 - L_2| = |((n_1^L+i)\lambda_1 + \Delta L_1) - ((n_2^L+j)\lambda_2 + \Delta L_2)| = |(L+i\lambda_1) - (L+j\lambda_2)| = |i\lambda_1 - j\lambda_2| \qquad [29]$$

Let $$\mu = \frac{\lambda_2}{\lambda_1} > 1,$$

then we have the following equation [30]:

$$\Delta = |L_1 - L_2| = |i - \mu j|\lambda_1 \qquad [30]$$

We know that in equation [30], $i\epsilon[-n_1^L, -1]\cup[1,N_1]$ and $j\epsilon[-n_2^L,-1]\cup[1,N_2]$, where $N_1$, $N_2$ are known number, while $n_1^L \leq N_1$, $n_2^L \leq N_2$ are variables varying with different length L.

In order to simplify the analysis, we let $i\epsilon[-N_1,-1]\cup[1, N_1]$ and $j\epsilon[-N_2,-1]\cup[1, N_2]$. It is clear that the results based on $i\epsilon[-N_1,-1]\cup[1, N_1]$ and $j\epsilon[-N_2,-1]\cup[1, N_2]$ should also be true for the tight sets $i\epsilon[-n_1^L,-1]\cup[1,N_1]$ and $j\epsilon[-n_2^L,-1]\cup[1, N_2]$, because the former sets including the later sets. Although with such simplification, the obtained result will not be optimum but only sub-optimum result, it is very helpful for further analysis.

In addition, the difference Δ is an absolute value, so $i\epsilon[-N_1,-1]\cup[1,N_1]$ and $j\epsilon[-N_2,-1]\cup[1,N_2]$ are equivalent to $i\epsilon[-N_1,-1]$ and $j\epsilon[-N_2,-1]$, respectively.

So, the equation [30] can be rewrite as the following equation [31]:

$$\Delta = \begin{vmatrix} \mu-1 & 2\mu-1 & \cdots & N_2\mu-1 \\ \mu-2 & 2\mu-2 & \cdots & N_2\mu-2 \\ \vdots & \vdots & \ddots & \vdots \\ \mu-N_1 & 2\mu-N_1 & \cdots & N_2\mu=N_1 \end{vmatrix}_{N_1 \times N_2} \quad [31]$$

In order to make the measurement robust, we shall find the minimum value of Δ, then search a couple of multi-frequency $f_1$ and $f_2$ such that the $\Delta_{min}$ is maximized. That is in accordance with the following equation [32]:

$$\max(\Delta_{\min}) = \max\left\{\min\left(\begin{vmatrix} \mu-1 & 2\mu-1 & \cdots & N_2\mu-1 \\ \mu-2 & 2\mu-2 & \cdots & N_2\mu-2 \\ \vdots & \vdots & \ddots & \vdots \\ \mu-N_1 & 2\mu-N_1 & \cdots & N_2\mu-N_1 \end{vmatrix}_{N_1 \times N_2}\right)\right\} \quad [32]$$

In conclusion, rule 2 is adhered to by he most robust couple of multi-frequency $f_1$; and $f_2$ for the length measurement that satisfies equation [32].

Again, the aforementioned discussion provides the framework for those having ordinary skill in the art to determine any number of preset frequency test signals of the present invention.

Still referring to FIGS. 3–8, those having ordinary skill in the art will further appreciate how to apply the inventive principles of the present invention to cables of varying lengths and to cable testers having a predetermined frequency generation range. Those having ordinary skill in the art will also appreciate the numerous advantages of the present invention including, but not limited to, a complete, convenient, and expedient technique for measuring a length of a cable.

Referring to FIG. 2, in practice, the present invention does not impose any limitations or any restrictions to the structural configurations of cable tester 30 in accordance with the inventive principles of the present invention. FIG. 9 illustrates on embodiment 130 of cable tester 30 that employs an interface connector 131, a relay/transformer matrix 132, a wiremap 133, analog switches 134, a microprocessor 135, a multiple frequency generator 136, a receiver 137, an analog-to-digital converter ("ADC") 138, an ethernet 139, a memory 140, a keypad 141 and a display/touch screen 142. Memory 140 store instructions operable with microprocessor 135 for measuring the length of cable 10 in accordance with the inventive principles of the present invention as would be appreciated by those having ordinary skill in the art.

Referring again to FIGS. 2–8, in practice, the present invention can be implemented with or without a confirmation measurement. Specifically, a first set of two or more preset frequency test signals can be determined to thereby determine a length measurement of a cable in accordance with the inventive principles of the present invention as described herein. Thereafter, one or more different sets of two or more preset test frequency signals can be determined to thereby determine a length measurement of a cable one or more additional times in accordance with the inventive principles of the present invention as described herein. The additional determination(s) of the length measurement of the cable are used to confirm the initial determination of the length measurement of the cable.

While the embodiments of the invention disclosed herein are presently considered to be preferred, various changes and modifications can be made without departing from the scope of the invention. The scope of the invention is indicated in the appended claims and all changes that come within the meaning and range of equivalents are intended to be embraced therein.

We claim:

1. A method of operating a cable tester in measuring a length of a cable, the method comprising:
   determining a plurality of preset frequency test signals for facilitating a length measurement of the cable based on a maximum measurable length of the cable; and
   measuring the length of the cable based on a first reflected phase shift between a first preset frequency test signal as transmitted at a transmission end of the cable and a first preset frequency reflection signal representative of a reflection of the first preset frequency test signal at a reflection end of the cable, and based on a second reflected phase shift between a second preset frequency test signal as transmitted at the transmission end of the cable and a second preset frequency reflection signal representative of a reflection of the second preset frequency test signal at the reflection end of the cable.

2. The method of claim 1, wherein the determining of the plurality of preset frequency test signals for facilitating the length measurement of the cable based on the maximum measurable length of the cable includes:
   determining each possible set of preset multi-frequency test signals based on the maximum measurable length of the cable; and
   determining an optimal set of preset multi-frequency test signals among the possible sets of preset multi-frequency test signals.

3. The method of claim 2, wherein the determining the optimal set of preset multi-frequency test signals among the possible sets of preset multi-frequency test signals includes:
   choosing the first preset test frequency based on an operational configuration of the cable tester;
   determining a reliable frequency couple variable based on the first preset test frequency; and
   determining the second preset test frequency based on the first preset test frequency and the reliable frequency couple variable.

4. The method of claim 3, wherein the determining of the reliable frequency couple variable based on the first preset test frequency includes:
   calculating a plurality of minimum step phase shifts based on a step increasing of a step frequency couple variable; and determining the reliable frequency couple variable based on a maximum phase shift among the plurality of minimum step phase shifts.

5. The method of claim 1, wherein the measuring of the length of the cable based on the first reflected phase shift and the second reflected phase shift includes:
calculating a first length variable of the cable based on a measurement of the first reflected phase shift.

6. The method of claim 5, wherein the measuring of the length of the cable based on the first reflected phase shift and the second reflected phase shift further includes:
calculating a second length variable of the cable based on a measurement of the second reflected phase shift.

7. The method of claim 6, wherein the measuring of the length of the cable based on the first reflected phase shift and the second reflected phase shift further includes:
calculating the length of the cable based on the first length variable of the cable and the second length variable of the cable.

8. The method of claim 7, wherein the calculating of the length of the cable based on the first length variable of the cable and the second length variable of the cable includes:
determining a first length validation integer and a second length validation integer for validating the first length variable of the cable and the second length variable of the cable.

9. The method of claim 1, further comprising:
measuring the length of the cable based on a third reflected phase shift between a third preset frequency test signal as transmitted at the transmission end of the cable and a third preset frequency reflection signal representative of a reflection of the third preset frequency test signal at the reflection end of the cable, and based on a fourth reflected phase shift between a fourth preset frequency test signal as transmitted at the transmission end of the cable and a fourth preset frequency reflection signal representative of a reflection of the fourth preset frequency test signal at the reflection end of the cable to thereby confirm the measuring of the length of the cable based on the first reflected phase shift and the second reflected phase shift.

10. A cable tester, comprising:
a processor; and
a memory operable to store instructions operable with the processor for measuring a length of a cable, the instructions being executable for:
determining a plurality of preset frequency test signals for facilitating a length measurement of the cable based on a maximum measurable length of the cable; and
measuring the length of the cable based on a first reflected phase shift between a first preset frequency test signal as transmitted at a transmission end of the cable and a first preset frequency reflection signal representative of a reflection of the first preset frequency test signal at a reflection end of the cable, and based on a second reflected phase shift between a second preset frequency test signal as transmitted at the transmission end of the cable and a second preset frequency reflection signal representative of a reflection of the second preset frequency test signal at the reflection end of the cable.

11. The cable tester of claim 10, wherein the determining of the plurality of preset frequency test signals for facilitating the length measurement of the cable based on the maximum measurable length of the cable includes:
determining each possible set of preset multi-frequency test signals based on the maximum measurable length of the cable; and
determining an optimal set of preset multi-frequency test signals among the possible sets of preset multi-frequency test signals.

12. The cable tester of claim 11, wherein the determining the optimal set of preset multi-frequency test signals among the possible sets of preset multi-frequency test signals includes:
choosing the first preset test frequency based on an operational configuration of the cable tester;
determining a reliable frequency couple variable based on the first preset test frequency; and
determining the second preset test frequency based on the first preset test frequency and the reliable frequency couple variable.

13. The cable tester of claim 12, wherein the determining of the reliable frequency couple variable based on the first preset test frequency includes:
calculating a plurality of minimum step phase shifts based on a step increasing of a step frequency couple variable; and
determining the reliable frequency couple variable based on a maximum phase shift among the plurality of minimum step phase shifts.

14. The cable tester of claim 10, wherein the measuring of the length of the cable based on the first reflected phase shift and the second reflected phase shift includes:
calculating a first length variable of the cable based on a measurement of the first reflected phase shift.

15. The cable tester of claim 14, wherein the measuring of the length of the cable based on the first reflected phase shift and the second reflected phase shift further includes:
calculating a second length variable of the cable based on a measurement of the second reflected phase shift.

16. The cable tester of claim 15, wherein the measuring of the length of the cable based on the first reflected phase shift and the second reflected phase shift further includes:
calculating the length of the cable based on the first length variable of the cable and the second length variable of the cable.

17. The cable tester of claim 16, wherein the calculating of the length of the cable based on the first length variable of the cable and the second length variable of the cable includes:
determining a first length validation integer and a second preset measuring integer for validating the first length variable of the cable and the second length variable of the cable.

18. The cable tester of claim 10, wherein the instructions are further executable for:
measuring the length of the cable based on a third reflected phase shift between a third preset frequency test signal as transmitted at the transmission end of the cable and a third preset frequency reflection signal representative of a reflection of the third preset frequency test signal at the reflection end of the cable, and based on a fourth reflected phase shift between a fourth preset frequency test signal as transmitted at the transmission end of the cable and a fourth preset frequency reflection signal representative of a reflection of the fourth preset frequency test signal at the reflection end of the cable to thereby confirm the measuring of the length of the cable based on the first reflected phase shift and the second reflected phase shift.

19. A cable tester, comprising:

means for determining a first plurality of preset frequency test signals for facilitating a length measurement of the cable based on a maximum measurable length of the cable; and means for measuring the length of the cable based on a first reflected phase shift between a first preset frequency test signal as transmitted at a transmission end of the cable and a first preset frequency reflection signal representative of a reflection of the first preset frequency test signal at a reflection end of the cable, and based on a second reflected phase shift between a second preset frequency test signal as transmitted at the transmission end of the cable and a second preset frequency reflection signal representative of a reflection of the second preset frequency test signal at the reflection end of the cable.

20. The cable tester of claim 19, further comprising:

means for measuring the length of the cable based on a third reflected phase shift between a third preset frequency test signal as transmitted at the transmission end of the cable and a third preset frequency reflection signal representative of a reflection of the third preset frequency test signal at the reflection end of the cable, and based on a fourth reflected phase shift between a fourth preset frequency test signal as transmitted at the transmission end of the cable and a fourth preset frequency reflection signal representative of a reflection of the fourth preset frequency test signal at the reflection end of the cable to thereby confirm the measuring of the length of the cable based on the first reflected phase shift and the second reflected phase shift.

* * * * *